US010439272B1

(12) United States Patent
Rowson et al.

(10) Patent No.: US 10,439,272 B1
(45) Date of Patent: Oct. 8, 2019

(54) BEAM STEERING SYSTEM CONFIGURED FOR MULTI-CLIENT NETWORK

(71) Applicant: Ethertronics, Inc., San Diego, CA (US)

(72) Inventors: Sebastian Rowson, San Diego, CA (US); Abhishek Singh, San Diego, CA (US); Laurent Desclos, San Diego, CA (US)

(73) Assignee: Ethertronics, Inc., San Diego, CA (US)

( * ) Notice: Subject to any disclaimer, the term of this patent is extended or adjusted under 35 U.S.C. 154(b) by 0 days.

(21) Appl. No.: 15/360,946

(22) Filed: Nov. 23, 2016

Related U.S. Application Data

(60) Provisional application No. 62/258,859, filed on Nov. 23, 2015.

(51) Int. Cl.
*H01Q 1/24* (2006.01)
*H01Q 1/22* (2006.01)
*H01Q 25/04* (2006.01)
*H01Q 3/34* (2006.01)
*H04W 24/02* (2009.01)
*H04B 7/06* (2006.01)
*H04W 84/12* (2009.01)
*H04B 7/0413* (2017.01)
*H04W 88/10* (2009.01)
*H01Q 21/28* (2006.01)

(52) U.S. Cl.
CPC .......... *H01Q 1/246* (2013.01); *H01Q 1/2283* (2013.01); *H01Q 3/34* (2013.01); *H01Q 25/04* (2013.01); *H04B 7/0695* (2013.01); *H04W 24/02* (2013.01); *H01Q 21/28* (2013.01); *H04B 7/0413* (2013.01); *H04W 84/12* (2013.01); *H04W 88/10* (2013.01)

(58) Field of Classification Search
CPC ........................... H04B 7/0413; H04B 7/0695
See application file for complete search history.

(56) References Cited

U.S. PATENT DOCUMENTS

| 4,849,363 | A  | 7/1989  | Coffey et al.  |
|-----------|----|---------|----------------|
| 6,930,257 | B1 | 8/2005  | Hiner et al.   |
| 7,463,191 | B2 | 12/2008 | Dybdal et al.  |
| 7,911,402 | B2 | 3/2011  | Rowson et al.  |
| 8,143,529 | B2 | 3/2012  | Harada et al.  |
| 8,270,909 | B2 | 9/2012  | Zhang et al.   |
| 8,362,962 | B2 | 1/2013  | Rowson et al.  |
| 8,526,892 | B2 | 9/2013  | Zhang et al.   |
| 8,648,755 | B2 | 2/2014  | Rowson et al.  |
| 8,826,531 | B1 | 9/2014  | Hiner et al.   |
| 9,065,496 | B2 | 6/2015  | Rowson et al.  |

(Continued)

*Primary Examiner* — Ricardo I Magallanes
(74) *Attorney, Agent, or Firm* — Dority & Manning, P.A.

(57) ABSTRACT

A beam steering antenna system and algorithm are described where radiation mode selection is made based on communication link quality metrics from multiple clients. Flexibility in both antenna system hardware and the algorithm allow for an optimized communication link as the communication system transitions from single client to multi-client operation. The beam steering system and algorithm are described where beam steering capability can be implemented on one or both sides of the communication link and for single and multi-client operation, and for simultaneous or sequential operation.

4 Claims, 13 Drawing Sheets

(56) References Cited

U.S. PATENT DOCUMENTS

| | | | |
|---|---|---|---|
| 9,231,669 B2 | 1/2016 | Desclos et al. | |
| 9,240,634 B2 | 1/2016 | Rowson et al. | |
| 9,425,497 B2 | 8/2016 | Pajona et al. | |
| 9,479,242 B2 | 10/2016 | Desclos et al. | |
| 9,590,703 B2 | 3/2017 | Desclos et al. | |
| 9,755,580 B2 | 9/2017 | Desclos et al. | |
| 2013/0109327 A1* | 5/2013 | Matsumori | H04W 24/02 455/73 |
| 2013/0109449 A1* | 5/2013 | Desclos | H04B 7/0413 455/575.7 |
| 2013/0278477 A1* | 10/2013 | Dupuy | H01Q 1/50 343/852 |
| 2016/0020838 A1* | 1/2016 | Desclos | H04B 7/0689 455/500 |
| 2016/0099501 A1 | 4/2016 | Rowson et al. | |
| 2016/0360543 A1* | 12/2016 | Elsherif | H04B 7/0452 |

* cited by examiner

Multiple radiation modes surveyed from Modal antenna and mode selected for multi-client operation
Mode can be selected to optimize for simultaneous communication with clients or sequential communication Synchronization of Beam Steering With Digital Beam Forming (with faster RSSI updates from Baseband)

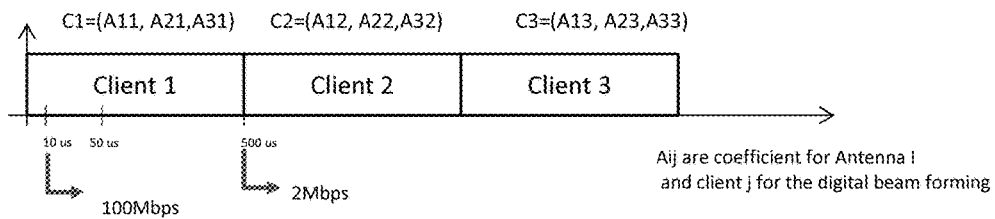
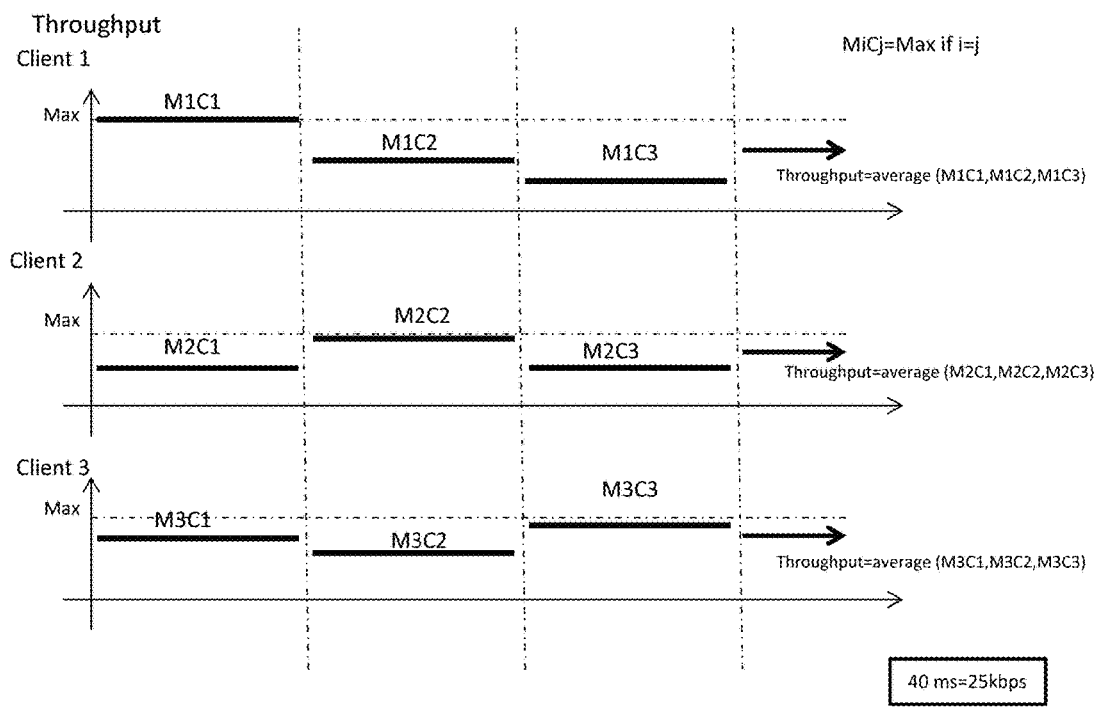
Figure 7

The use of Modal antennas provides additional combinations of antenna beam configurations.
Digital beam forming coefficients can be determined per antenna, per mode.
Statistics on communication link metric can be established for the mode combinations during system initialization and during system operation.

Access point with modal antenna system and algorithm communicates with three client devices.
Client devices are positioned at different aspect angles in relation to the access point. The algorithm
samples throughput or other metric for mode combinations for all clients and makes mode selection decision based on
criteria for serving clients.

First step ...elimination of the Minima in the table

|         | (0,0,0) | (1,0,0) |  |  |  | (2,2,2) |
|---------|---------|---------|--|--|--|---------|
| Sum     |         |         |  |  |  |         |
| Average |         |         |  |  |  |         |
| Min     |         |         |  |  |  |         |

Second step ...selection of the best averages

|         | (0,0,0) | (1,0,0) |  |  |  | (2,2,2) |
|---------|---------|---------|--|--|--|---------|
| Sum     |         |         |  |  |  |         |
| Average |         |         |  |  |  |         |
| Min     |         |         |  |  |  |         |

Third step ...selection of the best max ⟶ Based on client requirements

|         | (0,0,0) | (1,0,0) |  |  |  | (2,2,2) |
|---------|---------|---------|--|--|--|---------|
| Sum     |         |         |  |  |  |         |
| Average |         |         |  |  |  |         |
| Min     |         |         |  |  |  |         |

Figure 9

- Multiple radiation modes at both Access Point and client surveyed from Modal antennas and mode selected for multi-client operation
- The algorithm located in processor in access point controls both Modal antennas, in Access point and Client 1
- Optimal modes are selected for comm link from access point to Client 1

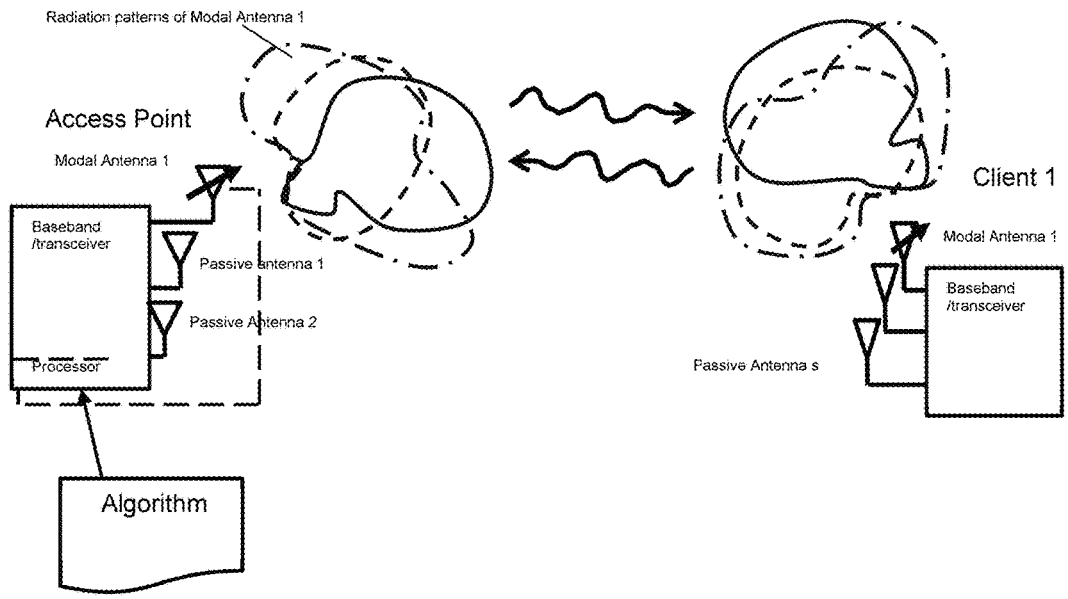

Comm link metric of modes of Modal antenna in Access Point

Comm link metric of modes of Modal antenna in Client 1

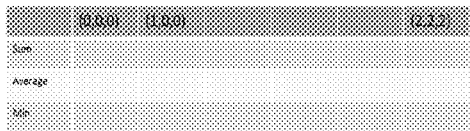

Figure 11

BEAM STEERING SYSTEM CONFIGURED FOR MULTI-CLIENT NETWORK

CROSS-REFERENCE TO RELATED APPLICATIONS

This application claims benefit of U.S. Provisional Ser. No. 62/258,859, filed Nov. 23, 2015; the entire contents of which are hereby incorporated by reference.

BACKGROUND

Field of the Invention

This invention relates generally to the field of wireless communication. In particular, the invention relates to a beam steering antenna system and algorithm configured for multi-client applications in a local area network (LAN) or cellular communication network.

Description of the Related Art

Wireless Local Area Networks (WLAN) are present across a wide swath in society and provide internet access to commercial users. The performance and complexity of WLAN systems has continued to improve and increase, with this increase documented in industry standards IEE 802.11b, 802.11g, 802.11a, 802.11n, and more recently 802.11ac. With each successive standard the performance of the WLAN systems has improved and the complexity, such as the introduction of MIMO for the antenna system has increased. The 802.11n and 802.11ac standards allow for both single client and multi-client operation, where a client is defined as a WLAN radio enabled user connected to a WLAN network. 802.11n and 802.11ac standards also allow for implementation of digital beam forming for situations where additional range and throughput is desired. Digital beam forming is where the communication link between the access point and client is characterized for each antenna connected to an access point, and a set of coefficients to alter the phase for each antenna in the antenna system is calculated in baseband and then applied to the RF channel with antenna to allow for an arrayed response to be generated from the multi-antenna system in the access point. This arraying of the multiple antennas in the access point eliminates the ability to implement MIMO operation, but if implemented properly the digital beam forming will result in a higher effective gain for the antenna system on the access point. The continued evolution of the WLAN standards have been spurred by the growing demand from data centric mobile devices and applications as more users move to these higher data rate devices. The growth of video file sharing is increasing the data rate requirements for both uplink and downlink in the WLAN environment. New optimization techniques are required to service a growing number of clients that are consuming a greater amount of data.

Current and future WLAN access points and client communication devices will require higher performance from the antenna systems to improve system capacity and increase data rates. As new generations of handsets, gateways, and other wireless communication devices become embedded with more applications and the need for bandwidth becomes greater, new antenna systems will be required to optimize link quality. Specifically, better control of the radiated field from the antenna system on the mobile or client side of the communication link along with the access point will be required to provide better communication link quality for an antenna system tasked to provide higher throughput.

Antenna beam steering techniques are well known and utilized on the base terminal side of the cellular communication link, as these beam steering techniques are also implemented on WLAN access points. However, beam steering techniques are currently missing from the client side primarily due to size constraints of the devices in use. Current cell phones, smart phones, tablet devices, and laptops are not large enough nor have the internal volume available to support multi-element antenna arrays needed to effectuate traditional beam steering techniques.

Commonly owned U.S. Pub. 2016/0099501 A1, and U.S. Pat. Nos. 9,240,634; 8,648,755; 8,362,962; and 7,911,402 each describe a beam steering technique wherein a single antenna is capable of generating multiple radiating modes; the contents of which are hereby incorporated by reference. This beam steering technique is effectuated with the use of offset parasitic elements that alter the current distribution on the driven antenna as the reactive load on the parasitic is varied. This beam steering technique where multiple modes are generated is referred to as a "modal" antenna technique, and an antenna configured to alter radiating modes in this fashion will be referred to here as a "modal antenna" or "multi-mode active antenna". This antenna architecture solves the problem associated with a lack of volume in mobile devices to accommodate antenna arrays needed to implement more traditional beam steering hardware.

SUMMARY

A beam steering antenna system and algorithm are described where radiation mode selection is made based on communication link quality metrics from multiple clients. Flexibility in both antenna system hardware and the algorithm allow for an optimized communication link as the communication system transitions from single client to multi-client operation. The beam steering system and algorithm are described where beam steering capability can be implemented on one or both sides of the communication link, and for single and multi-client operation, and for simultaneous or sequential operation.

BRIEF DESCRIPTION OF THE DRAWINGS

FIG. 7 illustrates a process for determining digital beam forming coefficients for the three antennas in a communication system. The throughput associated with each client is shown for beam forming coefficient sets.

FIG. 9 illustrates a process where a three beam steering antenna system with three radiation modes each can result in 27 antenna mode combinations. In this scenario, an access point with a beam steering antenna system is communicating with three clients. The client devices are positioned at different aspect angles in relation to the access point. The algorithm samples throughput or other metric for mode combinations for all clients and makes mode selection decision based on criteria for serving clients.

FIG. 11 illustrates a communication system including an access point and a client; both the access point and client have three antenna systems where two antennas are passive and the one of the three antennas is a modal antenna. An algorithm in the processor of the access point controls mode selection for both modal antennas. The mode for the client device can be selected to optimize the access point/client communication link, while the mode for the access point can be selected based on the characteristics of the other clients as well during multi-user operation.

DESCRIPTION OF THE INVENTION

Figure 1A:
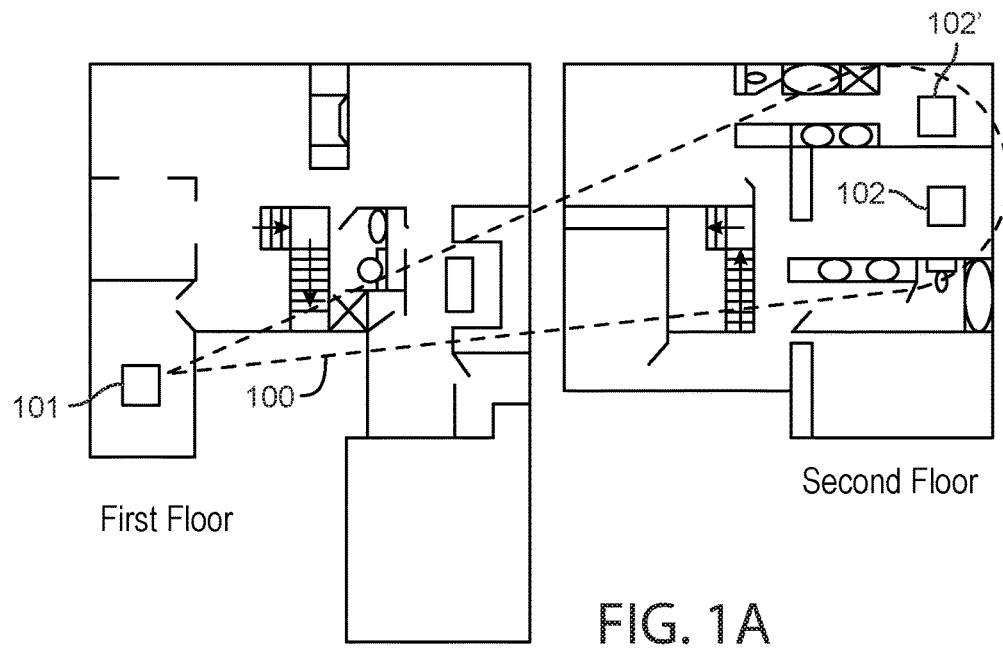
FIG. 1A shows a point to point communication link scenario between an access point and a single client device in a typical home.

In the following description, for purposes of explanation and not limitation, details and descriptions are set forth in order to provide a thorough understanding of the present invention in accordance with an illustrated embodiment. However, it will be apparent to those skilled in the art that the present invention may be practiced in other embodiments that depart from these details and descriptions without departing from the spirit and scope of the invention. An illustrated embodiment will be described below with reference to the drawings wherein illustrative features are denoted by reference numerals.

A modal antenna technique, such as that described in commonly owned U.S. U.S. Pub. 2016/0099501 A1, and U.S. Pat. Nos. 9,240,634; 8,648,755; 8,362,962; and 7,911,402, can be implemented in access points and client devices in WLAN systems and used to improve communication link performance for these networks. On the access point side of the link, when multi-user operation is required, the capability of optimizing the radiation pattern of the antennas in the access point will be material to optimizing link performance. Compared to a passive antenna used with an access point, the modal antenna can provide improved antenna gain performance in the direction of multiple clients.

In some embodiments, a beam steering antenna system and methodology for providing optimized communication links for a multi-user application is described. Both sequential and simultaneous data transfer is described between the beam steering enabled access point and the clients. This technique works well for WLAN systems where the number of clients accessing the system are dynamically changing and are oriented in a large number of aspect angles or directions from the access point. The beam steering system can be integrated into the access point (or node) side of a communication link, or the client (or mobile) side of the communication link, or can be integrated into both ends of the communication link to provide a more optimized communication solution. An algorithm is implemented in a processor to control antenna system beam state functionality to provide simultaneous or sequential links to multiple clients in the network. The technique can be synchronized with digital beam forming or other baseband initiated routines used to improve antenna system performance when multiple antennas are grouped or arrayed to provide a more directive radiation pattern for individual or groups of clients. The beam steering antenna technique will in effect improve the gain characteristics for each antenna in the system with this improvement applicable to multi-input multi-output (MIMO) operation, as well as digital beam forming operation.

One embodiment of this invention is a WLAN access point with multiple antennas, where the multiple antennas are used in a MIMO mode as well as with digital beam forming. One of these multiple antennas comprises a beam steering antenna system with an algorithm, where the modal antenna technique is used to generate multiple, different radiation patterns from the single antenna structure. For multi-client operation the algorithm coupled to the beam steering antenna (generally resident in a memory module coupled to a processor) selects the best radiation mode for the communication link to each client in the communication system and uses this best mode when communicating with the client. In sequential operation, the mode of the beam steering antenna is selected as each client is communicated with. The mode selection can be synchronized with the digital beam forming process to allow for beam steering antenna radiation modes to be correlated to beam forming coefficients. This coordination between digital beam forming and the beam steering function will provide a better optimized antenna system for use in establishing the communication link, resulting in increased range and throughput.

In another embodiment of this invention the beam steering antenna with algorithm previously described can be used when the WLAN access point is used for simultaneous communication between multiple clients. In this case the algorithm surveys a communication link metric from baseband which provides insight into the total or aggregate communication system performance, and the algorithm selects the optimal radiation mode for the beam steering antenna to improve this aggregate performance metric. This mode selection process can take into account different communication link scenarios for the multiple clients such as increasing throughput or range for a specific client at the expense of other clients, equalizing throughput across the population of clients, or attempting to improve the throughput of the weakest clients.

In another embodiment of this invention a plurality of beam steering antennas can be implemented in an access point to provide the capability of improving each individual antenna in the system. For this scenario a single algorithm can be used to drive the multi-beam steering antenna system. As previously described, these multiple beam steering antennas can be used for sequential as well as simultaneous operation in a multi-user application.

In yet another embodiment of this invention beam steering antennas can be integrated into both the access point and client side of the communication system, bringing further optimization of range and throughput. One or multiple beam steering antennas can be integrated into the access point and one or all of the client devices in the system. The algorithm used to command the beam steering antenna systems can be integrated in the access point and communication link metrics for the access point and client pairings can be surveyed and analyzed by the one algorithm. This one algorithm can select radiation modes for the beam steering antennas integrated into the client devices by communicating with the client devices over the wireless link. As with antennas integrated into the access point, the beam steering antennas integrated in the client devices can be optimized for both simultaneous and sequential operation.

In some embodiments, an access point is provided which includes: an antenna system, the antenna system comprising two or more antennas, at least one of the two or more antennas comprising a modal antenna capable of dynamically changing a radiation pattern mode thereof, the two or more antennas configured to combine signals for providing a beam forming effect, wherein the two or more antennas are further configured to switch between simultaneous and sequential operation with one or more client devices in a WLAN network. The modal antenna may comprise a radiating element positioned adjacent to a ground plane forming an antenna volume therebetween, and one or more parasitic conductor elements positioned adjacent to the radiating element, said one or more parasitic conductor elements each being coupled to a tunable component.

The tunable component may comprise a multi-port switch, said multi-port switch configured to couple one of said one or more parasitic elements to the ground plane, the multi-port switch further coupled to one or more reactive components, wherein the multi-port switch is configured to open-circuit, short-circuit, or reactively load the parasitic element. Alternatively, the tunable component can comprise a tunable capacitor, tunable inductor, or a combination thereof.

The antenna system can further comprise a processor and a memory module, said processor configured to sample one or more metrics associated with the modal antenna in each radiation pattern mode, and based on the sampled metrics determine an optimal mode of the modal antenna for optimizing a communication link between the access point and the one or more client devices. The one or more metrics can be selected from: receive signal strength indicator (RSSI), signal to interference plus noise ratio (SINR), error vector magnitude (EVM), or a combination thereof.

In some embodiments, the processor can be configured to execute an algorithm for selecting a radiation pattern mode of the antenna system for equalizing throughput of the client devices in the WLAN network.

In other embodiments, the processor can be configured to execute an algorithm for selecting a radiation pattern mode of the antenna system for increasing throughput for one of the devices of the client devices in the WLAN network.

In various embodiments, the antenna system can comprise two or more modal antennas, each of the modal antennas being configurable in a plurality of distinct radiation pattern modes.

The access point may further include a baseband unit and a transceiver, wherein the transceiver comprises a plurality of transmit and receive ports, each of the transmit and receive ports being coupled to the two or more antennas of the antenna system.

Figure 1B:
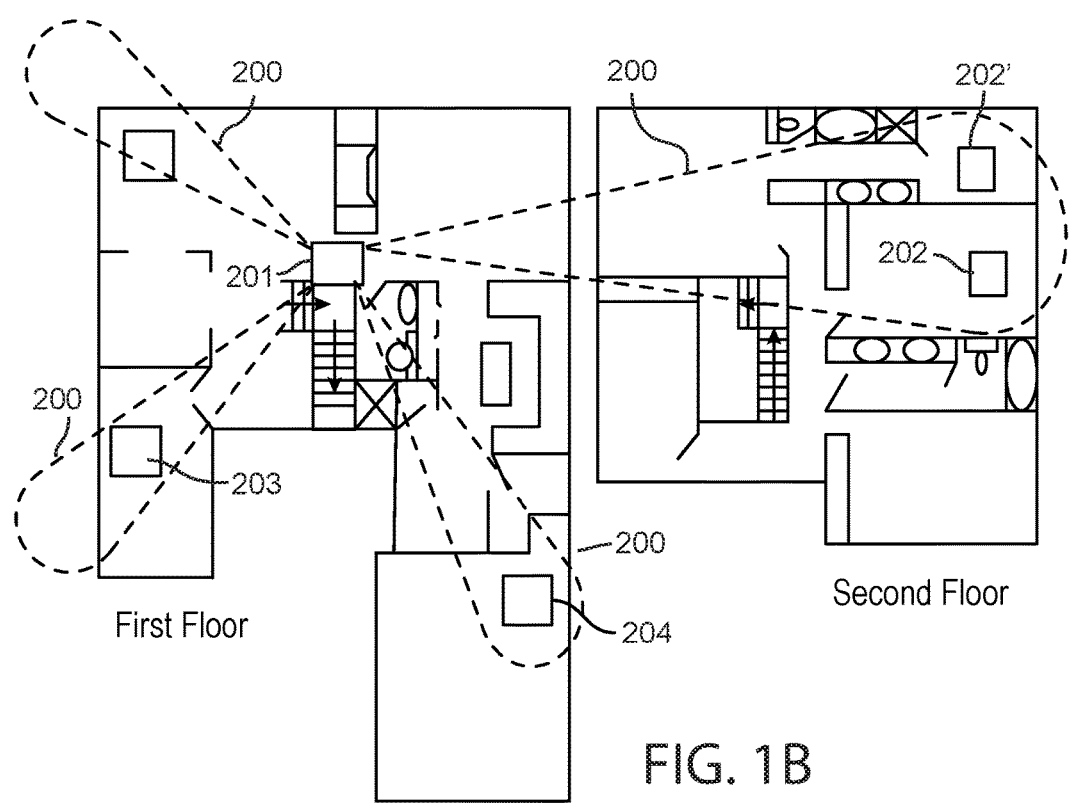
FIG. 1B shows a point to multi-point communication link scenario between an access point and a several client devices in a typical home.

Now turning to the drawings, FIG. 1 illustrates a point to point communication link scenario between an access point and a single client device in a typical home; also shown is a point to multi-point communication link scenario between an access point and a several client devices in a typical home.

Figure 2:
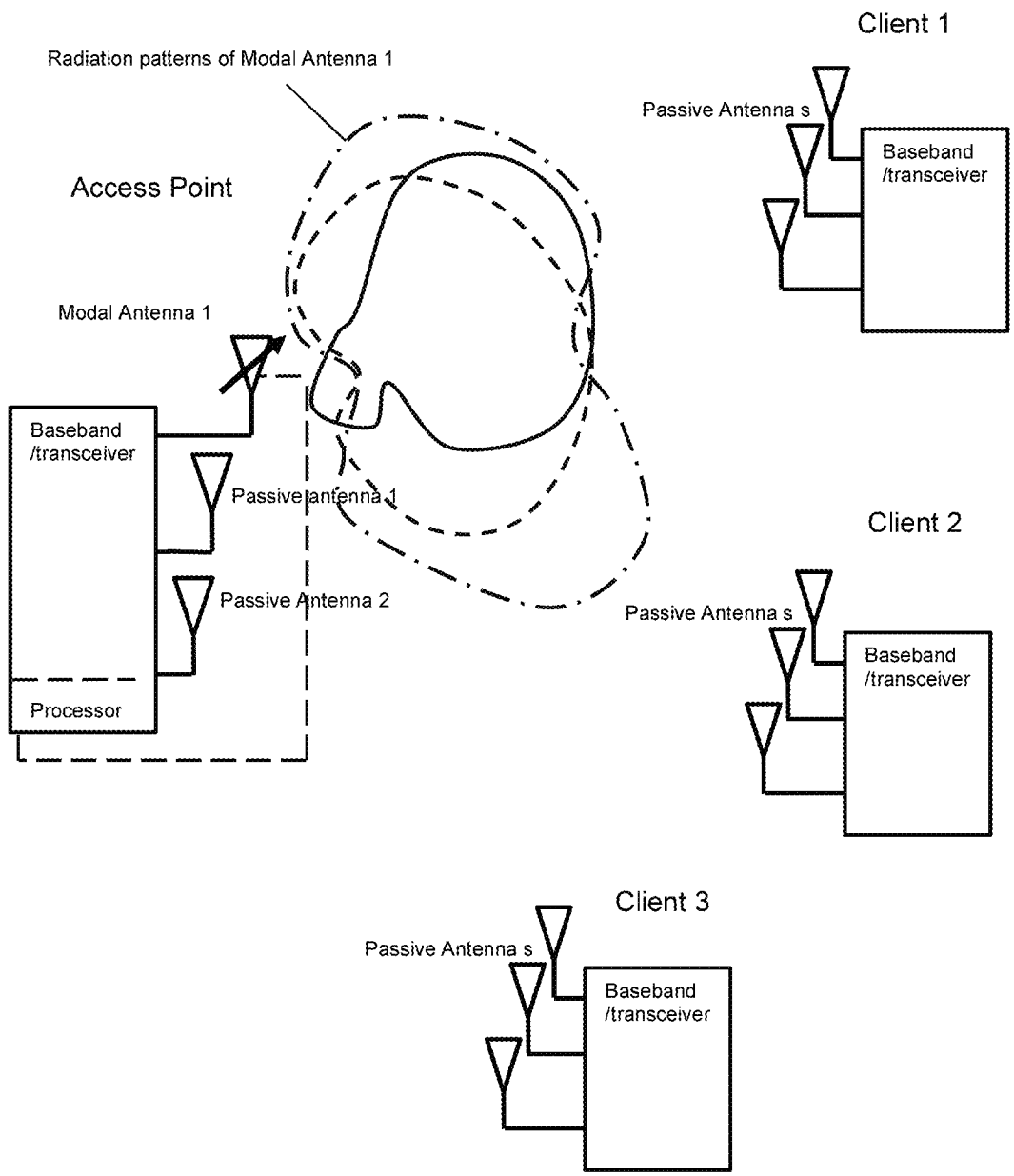
FIG. 2 shows three client devices communicating with an access point; the access point having a single modal antenna and two passive antennas. The mode of the modal antenna is selected to optimize for simultaneous communication or sequential communication with clients.

FIG. 2 illustrates a block diagram of an access point with a three antenna system, where one of the antennas is a Modal antenna capable of generating multiple radiation patterns. The other two antennas are passive antennas. Three client devices are shown, with each client device containing a three passive antenna system.

Figure 3:
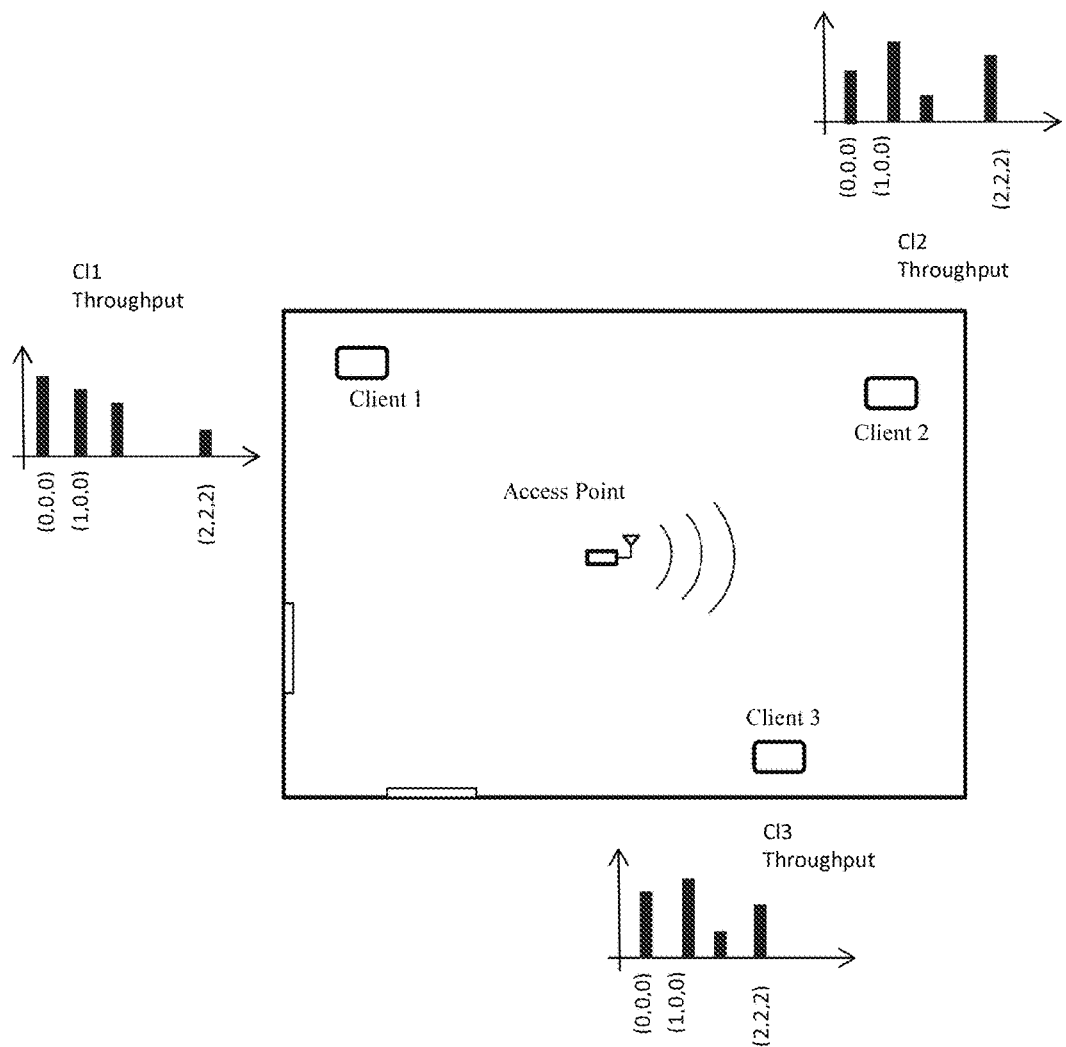
FIG. 3 shows an access point with integrated modal antenna and algorithm which establishes communication links with three client devices. Client devices are positioned at different aspect angles in relation to the access point. The algorithm samples throughput or other metric for mode combinations for all clients and makes mode selection decision based on criteria for serving clients.

FIG. 3 illustrates an Access point with modal antenna system and algorithm which establishes communication links with three client devices. Client devices are positioned at different aspect angles in relation to the access point. The algorithm samples throughput or other metric for mode combinations for all clients and makes mode selection decision based on criteria for serving clients.

Figure 4:
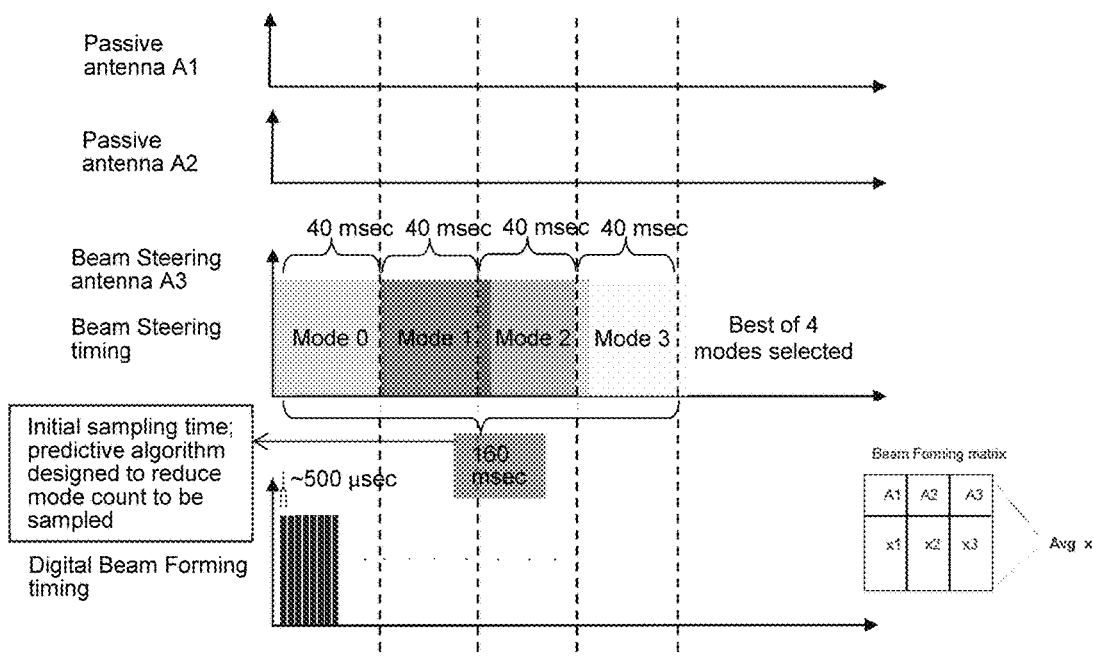
FIG. 4 shows a timing diagram illustrating synchronization of mode sampling and selection for a beam steering antenna system used in WLAN applications with digital beam forming. A three antenna system is characterized wherein one of the three antennas is a modal antenna capable of generating four unique modes.

FIG. 4 illustrates a timing diagram that describes synchronization of Mode sampling and selection for a beam steering antenna system used in WLAN applications with digital beam forming. A three antenna system is characterized wherein one of the three antennas is a beam steering antenna capable of generating four unique modes.

Figure 5:
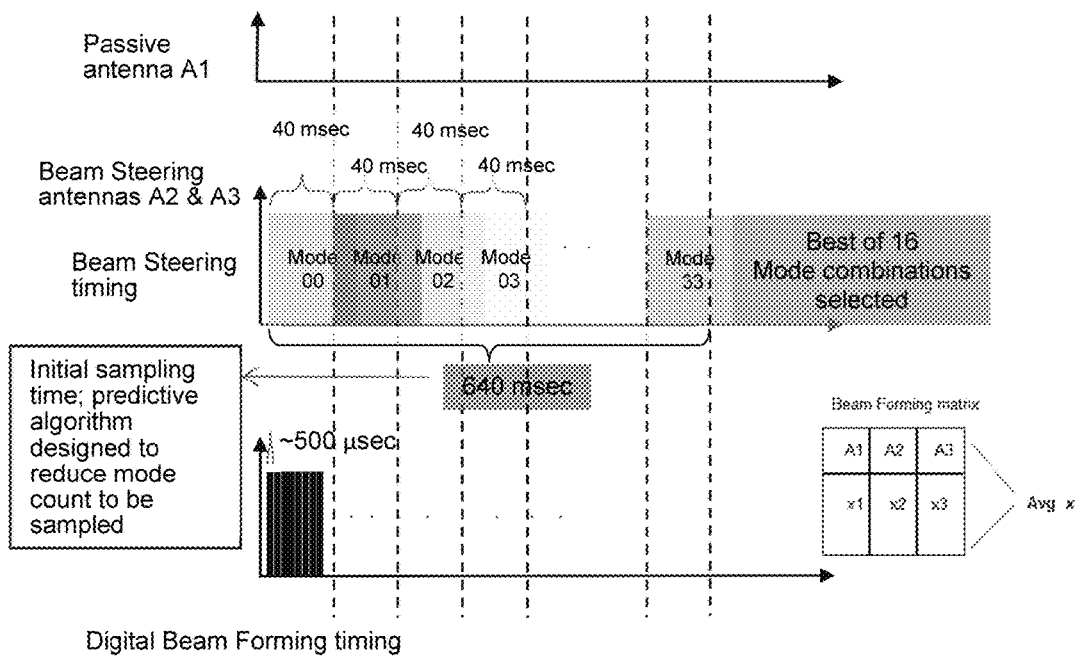
FIG. 5 shows a timing diagram illustrating synchronization of mode sampling and selection for a beam steering antenna system used in WLAN applications with digital beam forming. A three antenna system is characterized wherein two of the three antennas is a modal antenna capable of generating four unique modes.

FIG. 5 illustrates a timing diagram that describes synchronization of Mode sampling and selection for a beam steering antenna system used in WLAN applications with digital beam forming. A three antenna system is characterized wherein two of the three antennas are beam steering antenna capable of generating four unique modes each.

Figure 6:
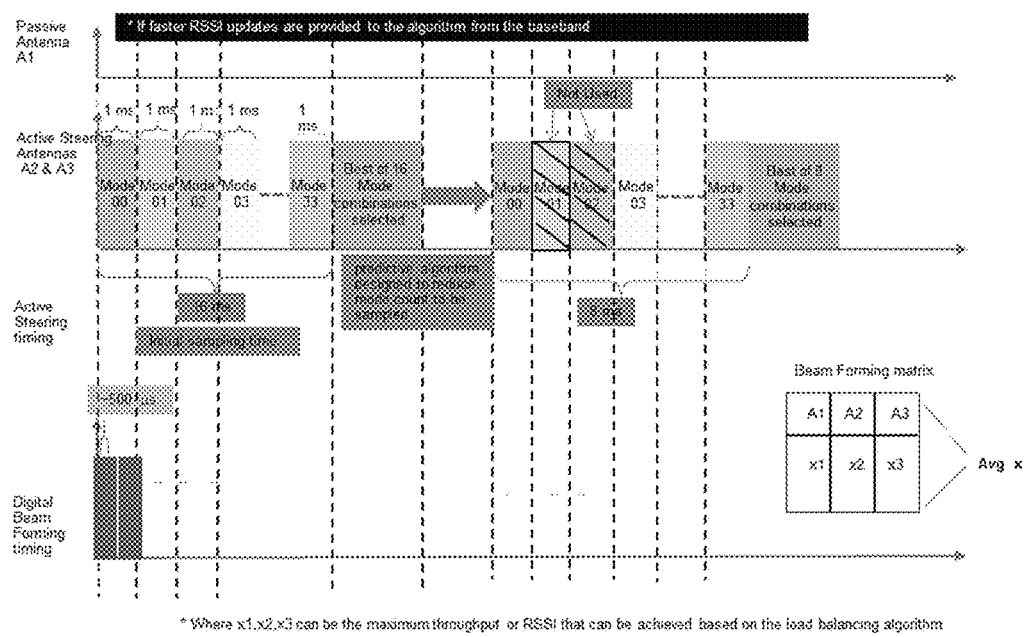
FIG. 6 shows a timing diagram illustrating synchronization of mode sampling and selection for a beam steering antenna system used in WLAN applications with digital beam forming. A three antenna system is characterized wherein two of the three antennas is a modal antenna capable of generating four unique modes. In this case a faster RSSI update is accessed from baseband to decrease the amount of time required to determine optimal mode.

FIG. 6 illustrates a timing diagram that describes synchronization of Mode sampling and selection for a beam steering antenna system used in WLAN applications with digital beam forming. A three antenna system is characterized wherein two of the three antennas are beam steering antenna capable of generating four unique modes each. In this case a faster RSSI update is accessed from baseband to decrease the amount of time required to determine optimal mode.

FIG. 7 illustrates the process of determining digital beam forming coefficients for the three antennas in a communication system. The throughput associated with each client is shown for beam forming coefficient sets.

Figure 8:
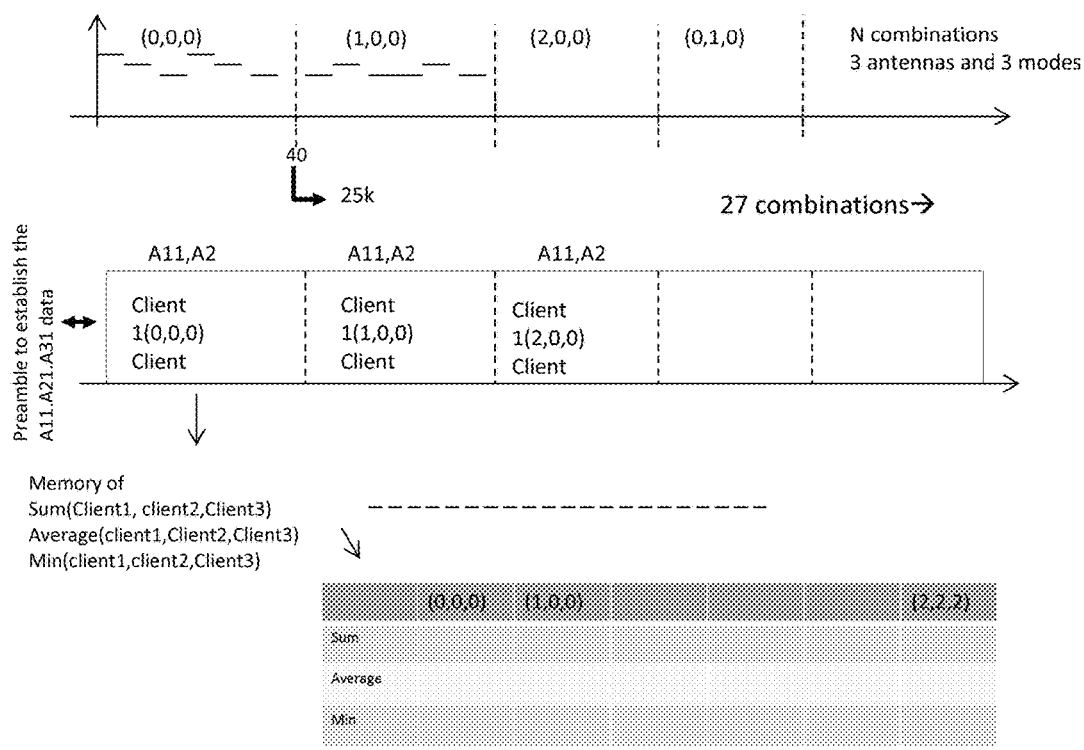
FIG. 8 illustrates a process where a three beam steering antenna system with three radiation modes each can result in 27 antenna mode combinations. These mode combinations can be surveyed and the throughput or other communication link metric can be associated with these mode combinations to determine which mode combination or combinations provide the best performance for the WLAN system.

FIG. 8 illustrates a process where a three beam steering antenna system with three radiation modes each can result in 27 antenna mode combinations. These mode combinations can be surveyed and the throughput or other communication link metric can be associated with these mode combinations to determine which mode combination or combinations provide the best performance for the WLAN system.

FIG. 9 illustrates a process where a three beam steering antenna system with three radiation modes each can result in 27 antenna mode combinations. In this scenario an access point with a beam steering antenna system is communicating with three clients. The client devices are positioned at different aspect angles in relation to the access point. The algorithm samples throughput or other metric for mode combinations for all clients and makes mode selection decision based on criteria for serving clients.

Figure 10:
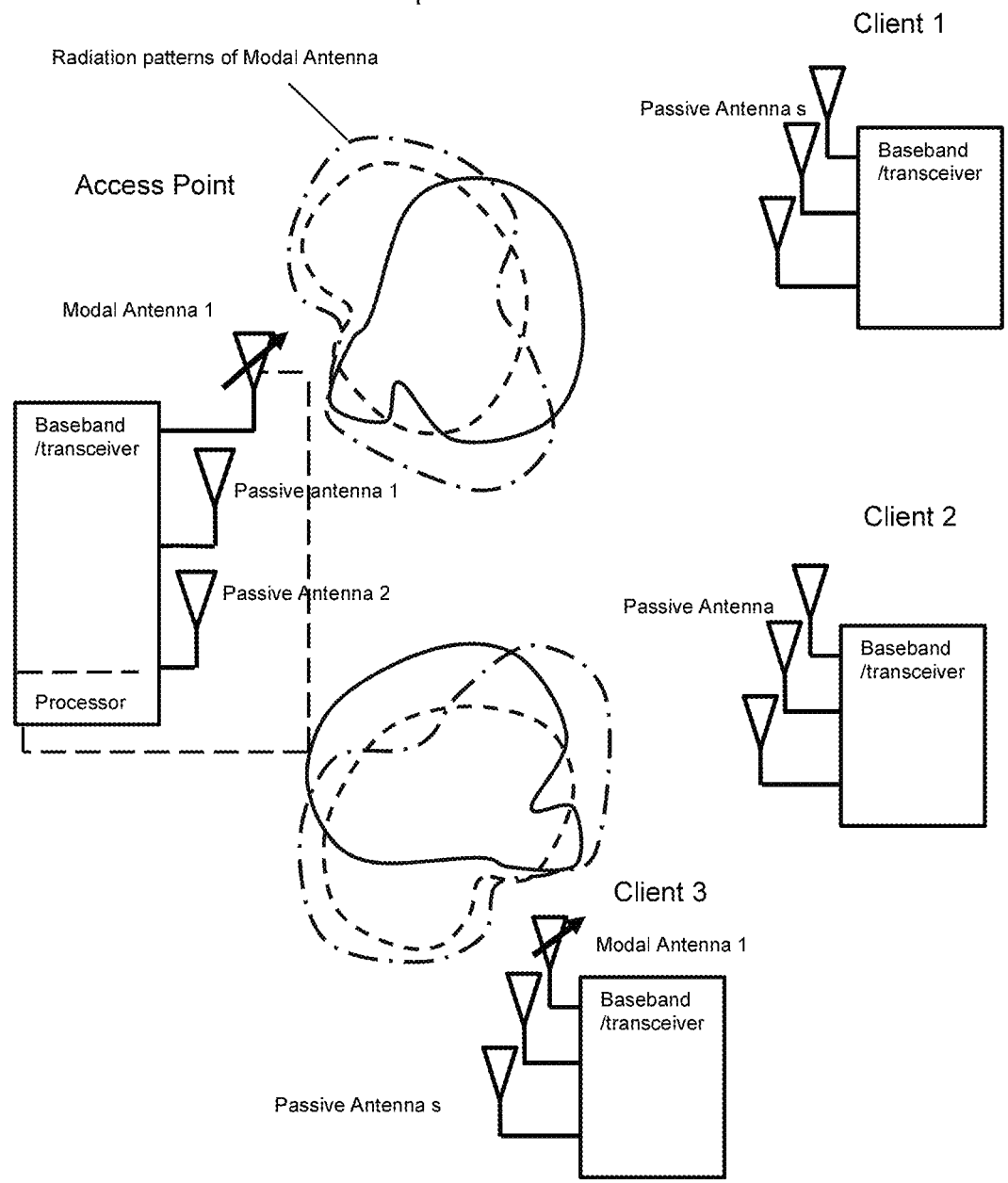
FIG. 10 shows an access point with a three antenna system, where one of the three antennas is a modal antenna capable of generating multiple radiation patterns, and the remaining antennas are passive antennas. Three client devices are shown, with one client containing a modal antenna capable of generating multiple radiation patterns at the client-side, and the other two client devices contain a three passive antenna system.

FIG. 10 illustrates a block diagram of an access point with a three antenna system, where one of the antennas is a Modal antenna capable of generating multiple radiation patterns. The other two antennas are passive antennas. Three client devices are shown, with one client containing a Modal antenna capable of generating multiple radiation patterns and the other two client devices containing a three passive antenna system.

FIG. 11 illustrates a communication system comprised of an access point and a client, labeled client 1. Both the access point and client 1 have three antenna systems where two antennas are passive and the third antenna is a Modal antenna. The algorithm in the processor of the access point controls mode selection for both Modal antennas (in access point and client 1). The mode for client 1 can be selected to optimize the access point/client 1 communication link, while the mode for the access point can be selected based on the characteristics of the other clients as well during multi-user operation.

Figure 12:
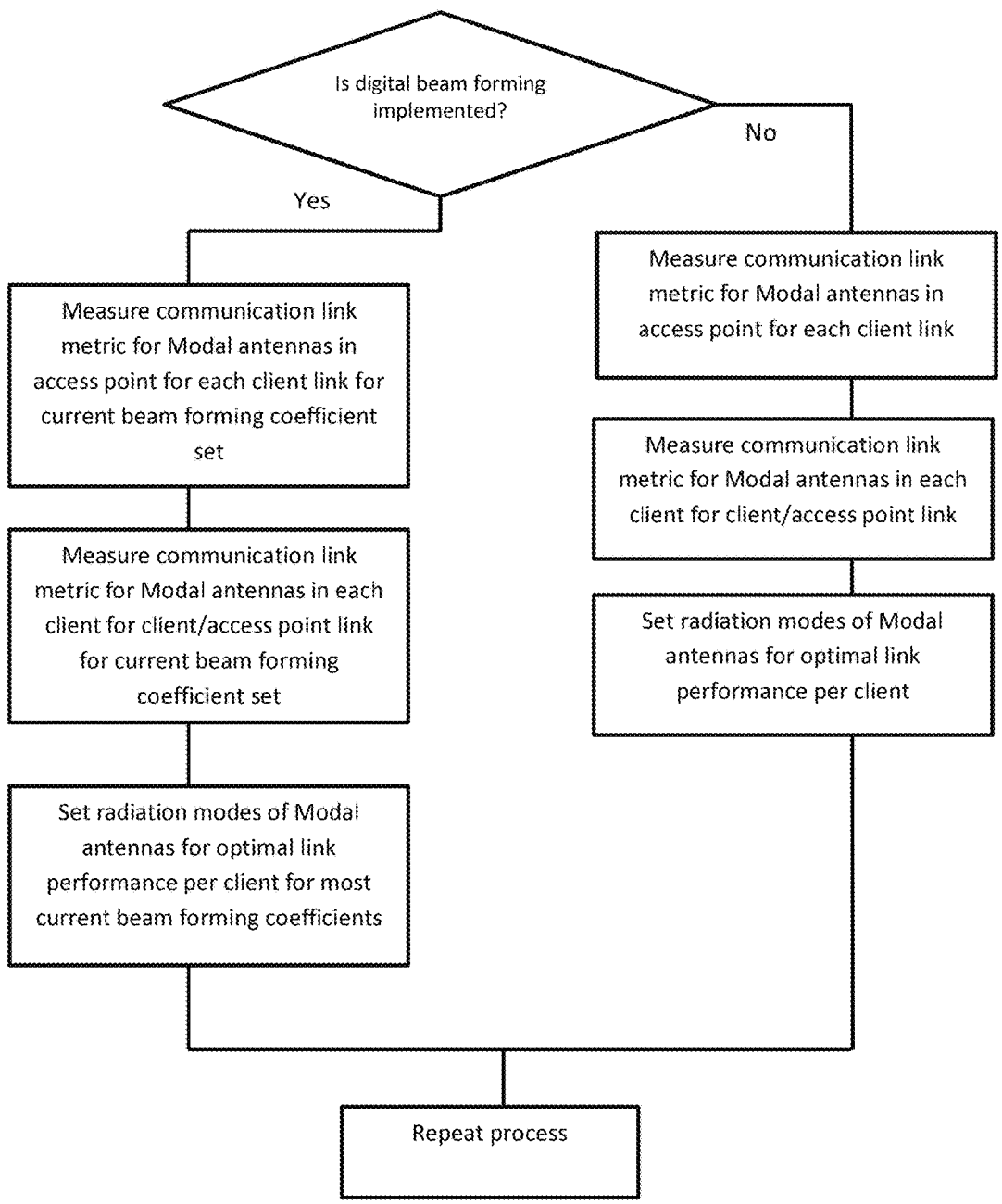
FIG. 12 illustrates a process for selecting radiation modes for the modal antennas in a communication system based on sequential operation across a population of client devices.

FIG. 12 illustrates a methodology for selecting radiation modes for the Modal antennas in a communication system based on sequential operation across a population of client devices.

Figure 13:
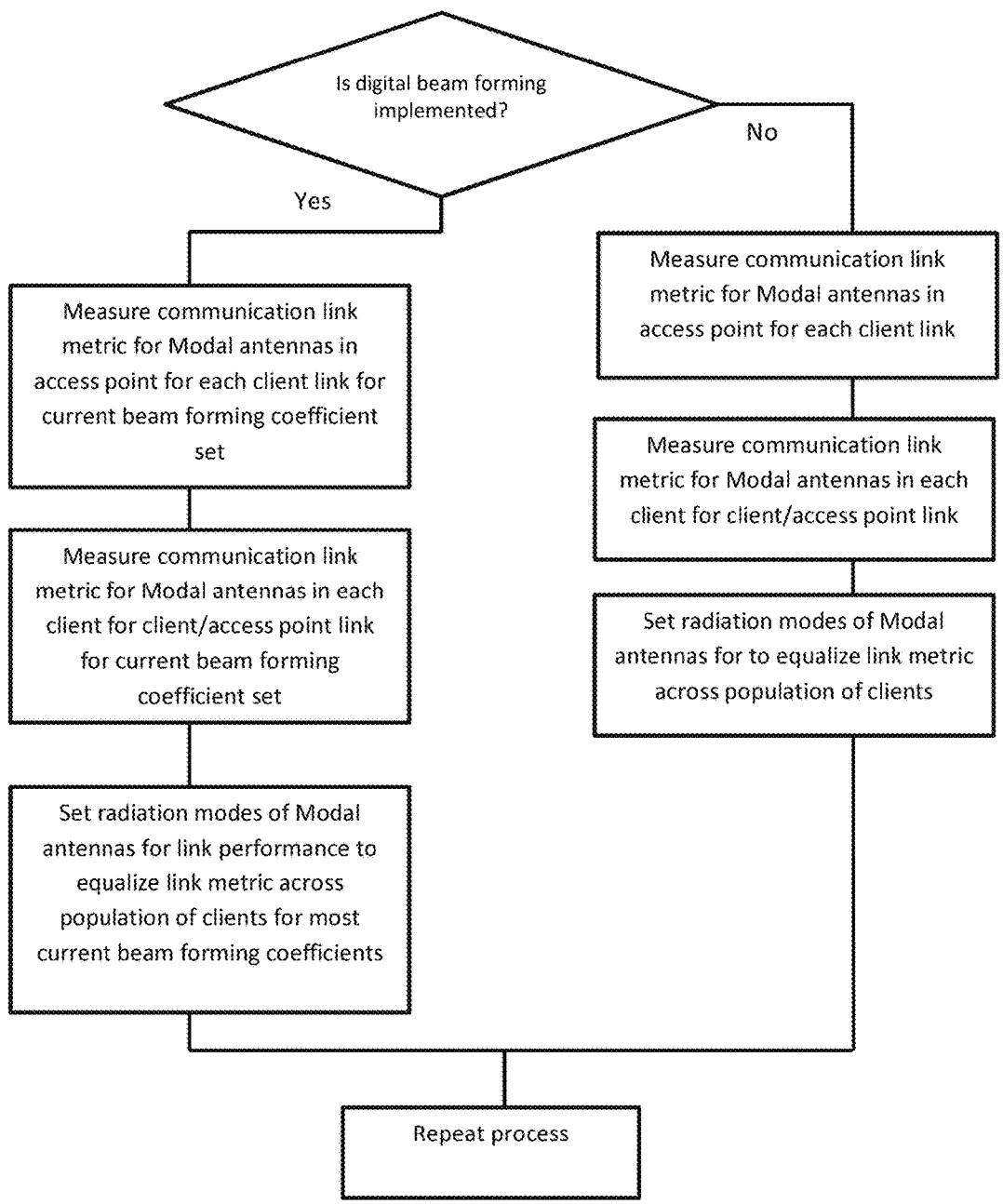
FIG. 13 illustrates a methodology for selecting radiation modes for the modal antennas in a communication system based on simultaneous operation across a population of client devices.

FIG. 13 illustrates a methodology for selecting radiation modes for the Modal antennas in a communication system based on simultaneous operation across a population of client devices.

What is claimed is:

1. An access point, comprising:
    an antenna system, the antenna system comprising two or more antennas,
    at least one of the two or more antennas comprising a modal antenna capable of dynamically changing a radiation pattern mode of the modal antenna, each radiation pattern mode associated with a different radiation pattern of a single antenna structure;
    the two or more antennas configured to combine signals for providing a beam forming effect,
    said antenna system further comprising a processor and a memory module, said processor configured to access one or more communication link metrics associated with the modal antenna in each radiation pattern mode for communication links with each of a plurality of client devices in a WLAN network, and determine a single radiation pattern mode for operating the modal antenna based at least in part on the communication link metrics to improve aggregate performance for the plurality of client devices in the WLAN network;
    wherein when the modal antenna is configured in the single radiation pattern mode, the modal antenna is configured to equalize throughputs across the plurality of client devices.

2. The access point of claim 1, wherein the one or more metrics comprise: receive signal strength indicator (RSSI), signal to interference plus noise ratio (SINR), error vector magnitude (EVM), or a combination thereof.

3. The access point of claim 1, wherein the processor is configured to execute an algorithm for selecting a radiation pattern mode of the antenna system for equalizing throughput of the plurality of client devices in the WLAN network.

4. The access point of claim 1, wherein the antenna system comprises two or more modal antennas, each of the modal antennas being configurable in a plurality of distinct radiation pattern modes.

* * * * *